(12) United States Patent
Liu et al.

(10) Patent No.: US 6,792,183 B1
(45) Date of Patent: Sep. 14, 2004

(54) METHOD FOR BONDING ALIGNED OPTICAL PARTS AND APPARATUS THEREOF

(75) Inventors: Yuqiao Liu, Sunnyvale, CA (US); Li Wang, San Jose, CA (US); Zhupei Shi, San Jose, CA (US); Wei-Shin Tsay, Saratoga, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 257 days.

(21) Appl. No.: 09/990,487

(22) Filed: Nov. 16, 2001

(51) Int. Cl.[7] ................................................. G02B 6/26

(52) U.S. Cl. .......................... 385/52; 385/49; 385/136; 385/137

(58) Field of Search ............................. 385/52, 14, 49, 385/88, 92, 136, 137, 147

(56) References Cited

U.S. PATENT DOCUMENTS

| 5,574,811 | A | * | 11/1996 | Bricheno et al. ............. 385/52 |
| 6,253,011 | B1 | * | 6/2001 | Haake .......................... 385/52 |
| 6,445,858 | B1 | * | 9/2002 | Musk .......................... 385/52 |
| 2003/0142916 | A1 | * | 7/2003 | Kwon et al. .................. 385/52 |

* cited by examiner

Primary Examiner—Brian M. Healy
(74) Attorney, Agent, or Firm—Joe Zheng; C. P. Chang

(57) ABSTRACT

Techniques for bonding aligned optical parts to a substrate are disclosed. According to one embodiment, one or more wedges are used to fill in gaps between aligned optical parts and a substrate. Using an appropriate material, the wedges are respectively slid in till respective contacts between the aligned optical parts and the wedges are established, a small amount of a bonding agent is then only applied to the respect contacts. As a result, the shrinkage that may be caused by the bonding agent to destabilize the aligned optical parts is minimized and the alignments among the optical parts are preserved and can sustain under very high environmental stresses.

20 Claims, 4 Drawing Sheets

METHOD FOR BONDING ALIGNED OPTICAL PARTS AND APPARATUS THEREOF

BACKGROUND OF THE INVENTION

1. Technical Field

The present invention relates to a method for bonding one or more aligned optical components to substrates using wedges to minimize any possible alternations to the aligned optical components.

2. Description of the Related Art

Fiber optical networks are becoming increasingly popular for data transmission due to their high speed and high capacity capabilities. There are many optical parts/devices used in the fiber optical networks that require a precise alignment between two elements or among three or more elements. Examples in which such alignments are beneficial include aligning two or more optical elements to achieve best coupling among them.

A precise alignment between two or more optical elements requires a number of procedures, each of the procedures could be very labor intensive. Once the alignment is done, any alternation or disturbance to the alignment may result in the disqualification of a resultant product using the aligned optical elements. There thus has been a need for an economic and reliable solution to bonding two or more aligned optical parts to a substrate without affecting the alignment in the optical parts.

SUMMARY OF THE INVENTION

The present invention, generally speaking, discloses a method for bonding an optical part to a substrate and an optical apparatus using the method, wherein the optical part has been aligned with one or more of other optical parts. One of the advantages and benefits in the present invention is the secure bonding of positions of the optical part with respect to other aligned optical parts. According to one aspect of the present invention, one or more wedges are used to fill in gaps between aligned optical parts and a substrate. Using a bonding agent (e.g. adhesive or solder) to fill in the gaps may induce an alternation or disturbance to the position of the aligned optical parts when the bonding agent is shrank, resulting in a possible misalignment. Using an appropriate material, the wedges are respectively slid in between an aligned optical part and a substrate till respective contacts between the aligned optical part and the wedges are established, a small amount of a bonding agent is then only applied to the respect contacts as well as the contacts between the wedges and the substrate. As a result, the shrinkage that may be caused by the bonding agent to destabilize the aligned optical parts is minimized and the alignments among the optical parts are preserved and can sustain under very high environmental stresses.

One of the objects in the present invention is to provide a solution to bonding aligned optical parts with one or more substrates without disturbing the alignments.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIGS. 2C and 2D show respectively two possible situations in which a wedge may flip over or up an already aligned optical part when being pushed to slide in;

DETAILED DESCRIPTION OF THE INVENTION

The present invention pertains to a method for bonding two or more aligned optical components using wedges to minimize any possible alternations or disturbance to the alignments in the aligned optical components and an optical apparatus using the method. According to one aspect of the present invention, after two optical parts are aligned, two or more preformed wedges are inserted into gaps between the wedges and a substrate that have been created for aligning the optical parts. As used herein and will be further understood, a preformed wedge is specifically shaped to avoid disturbances to the aligned optical parts when being slid between the optical parts and the substrate. After the wedges are positioned, a small amount of a bonding agent is then applied to only the contacts between the optical parts and the wedges. The wedges are then bonded to the substrate. As a result, the shrinkage that may be caused by the bonding agent to destabilize the aligned optical parts is minimized and the alignment of the optical parts is substantially preserved and can be sustained under very high environmental stresses.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1A:
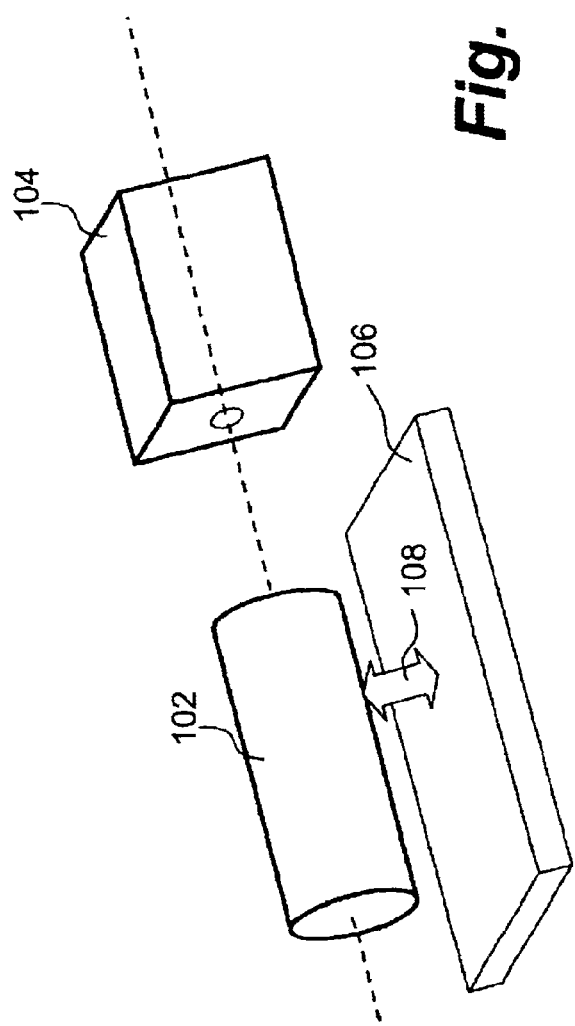
FIG. 1A shows a setting in which two optical parts (e.g. collimators) and are being aligned before they are permanently bonded to a substrate to constitute a whole device or part of a device.

Referring now to the drawings, in which like numerals refer to like parts throughout the several views. FIG. 1A shows a setting 100 in which two optical parts (e.g. collimators) 102 and 104 are being aligned before the optical part 102 is permanently bonded to a substrate 106 to constitute a whole device or part of a device. In optical applications, the alignment of two or more optical parts needs to be performed precisely to avoid optical signal loss/distortion. In one exemplary alignment procedure, the optical part 102 is elevated a small distance 108 (i.e. gaps) from the substrate 106 so that adjustment of the optical part 102 can be performed with respect to the optical part or device 104. Once the alignment of the two optical parts is done, the prior art method is to apply a kind of bonding agent, such as epoxy, to fill in the gaps between the aligned optical part and the substrate. Another prior art method is to fill in the gaps between the aligned optical part and the substrate with solder (or alloy), as a result, a single optical part or an integrated part of an optical device is formed.

In reality, however, it has been noticed that the filling material, either the bonding agent or the solder, can shrink when it is dried out or cool down, resulting in an undesirable alternation or disturbance to the positions of the originally aligned optical parts.

According to one aspect of the present invention, the gaps illustrated in FIG. 1A is not to be filled with any agent, instead, two or more preformed wedges are used to hold up the originally aligned optical parts when a boding agent is applied. To bond the optical parts to the wedges, a small amount of a bonding agent (e.g. epoxy) is used but only applied to respective contacts between the optical parts and the wedges. Because the amount of the bonding agent is small and the wedges primarily position the optical parts, the alignment of the optical parts is preserved. In fact, the use of the wedges can sustain the alignment under very high environmental stresses (e.g. varying temperatures and vibrations).

Figure 1B:
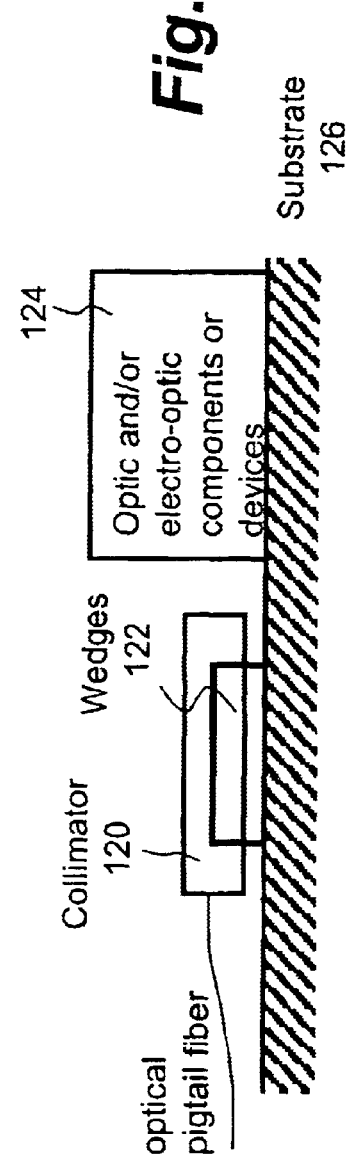
FIG. 1B shows that a collimator is being positioned by wedges after it is aligned with an optical component or device.

FIG. 1B shows that a collimator 120 is being positioned by wedges 122 after the collimator 120 has been aligned with an optical component or device 124 (collectively to represent one or more optical parts/devices). The gaps between the collimator 120 and the substrate 126 are created for aligning the collimator 120 with the device 124. As shown in the figure, the wedges 122 are used to fill in the gaps and at the same time to hold up the positions of the collimator 120 to maintain the alignment.

Figure 2B:
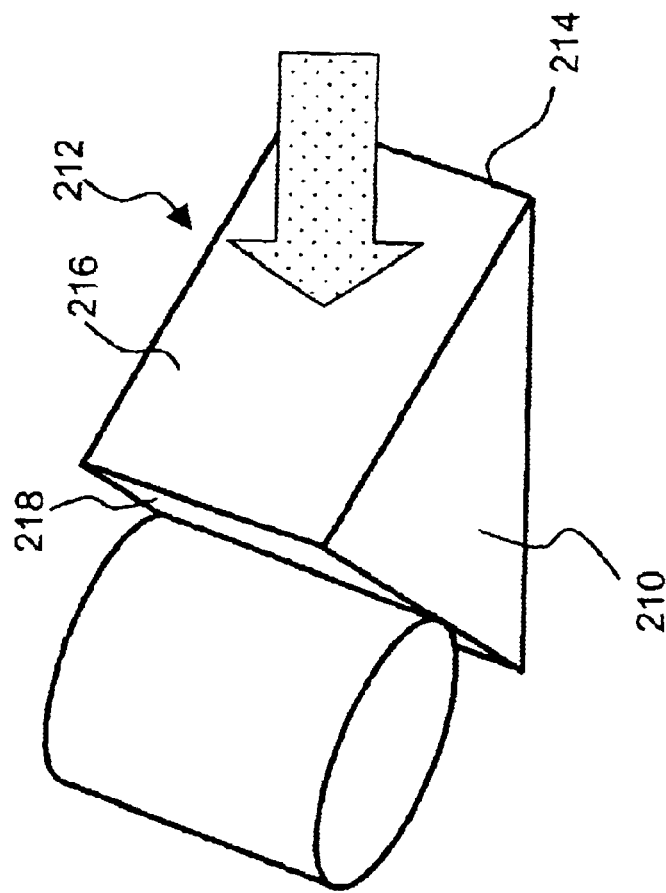
FIG. 2B illustrates a wedge having a cross-section being right triangular and being slid towards a cylindrical optical part.
Figure 2A:
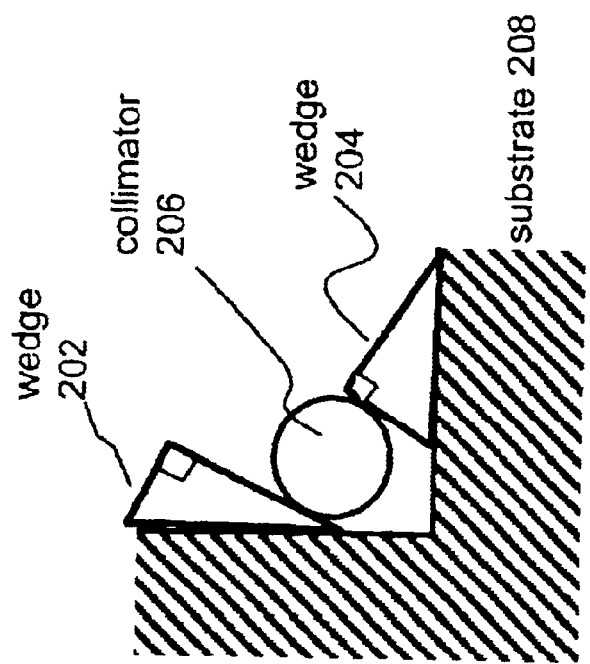
FIG. 2A shows a cross-section view of an optical part being positioned by two wedges and bonded to a substrate.

Referring now to FIG. 2A, there is shown a cross-section view of an optical part 206 being positioned by two wedges 202 and 204 and bonded to a substrate 208. In operation, the optical part 206 (e.g. a collimator) is first aligned with another optical part (not shown). To perform the alignment, one or both of the optical parts are slightly positioned away from the substrate 208 so that one or both of the optical parts can be adjusted appropriately to ensure that both of the optical parts are aligned with each other. Once the alignment is done, the positions of the optical parts shall be preserved. The two wedges 202 and 204 are respectively slid in from two different directions to hold up the positions of the optical parts when a boding agent is applied. According to one embodiment, a small amount of a bonding agent is applied to only the respective contacts between the contacting surfaces of the optical parts and the wedges. The wedges are then fastened to the substrate by a bonding means (e.g. adhesive, solder, or mechanic fixing).

Figure 2D:
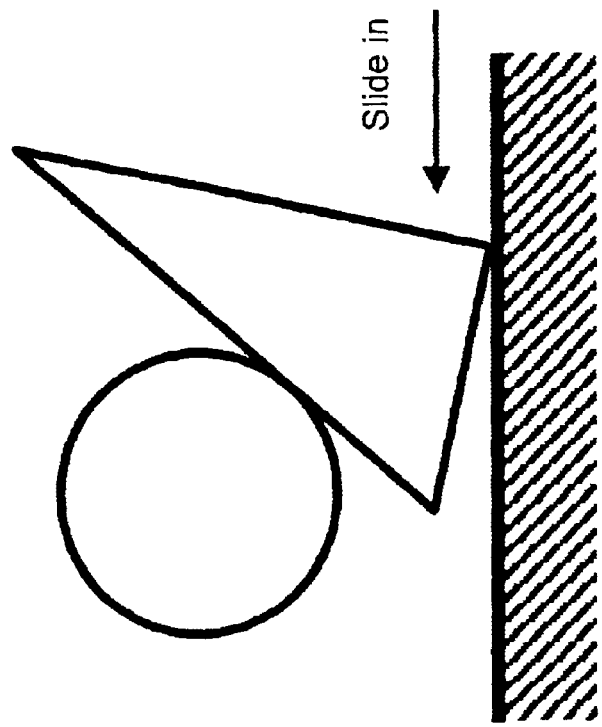
Figure 2C:
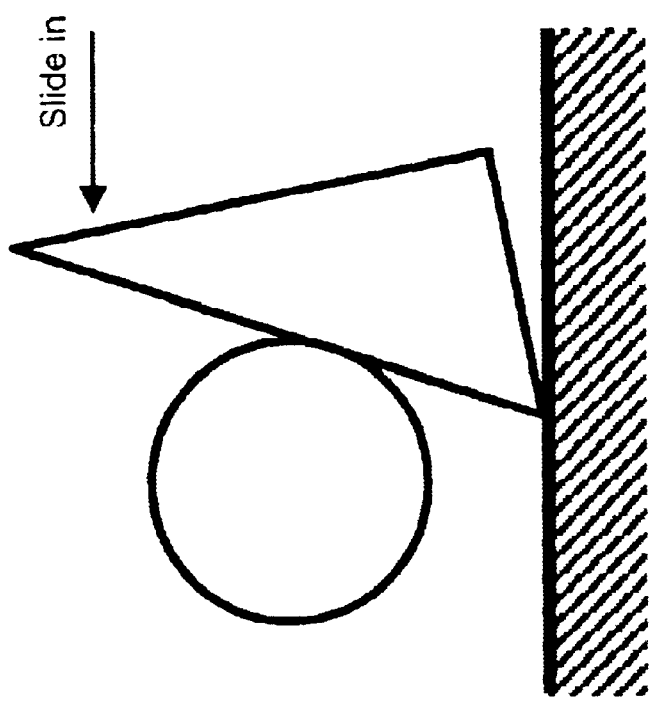

According to one embodiment, the cross section 210 of the wedge 212 is shaped as a right triangle, shown in FIG. 2B. In operation, the wedge is slid in with the sliding face (formed by the hypotenuse of the right triangle) downward to avoid possible flipping over or up the already aligned optical parts as shown respectively in FIGS. 2C and 2D.

Figure 3:
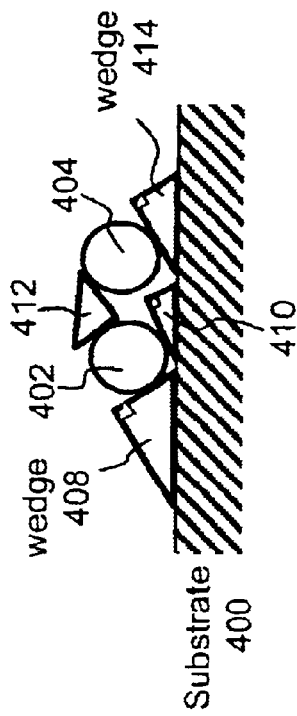
FIG. 3 shows another setting in which a set of aligned optical parts (only one being shown) are being bonded to a flat substrate.

FIG. 3 shows another setting 300 in which a optical part 304 is being bonded to a flat substrate 302. Similarly, after the optical part 304 is aligned, two or more wedges 306 and 308 are slid in from two opposite directions to hold up the positions of the aligned optical part. Then a bonding agent is applied to only the contacts between the optical parts 304 and the wedges that are then bonded to substrate 302.

Figure 4:
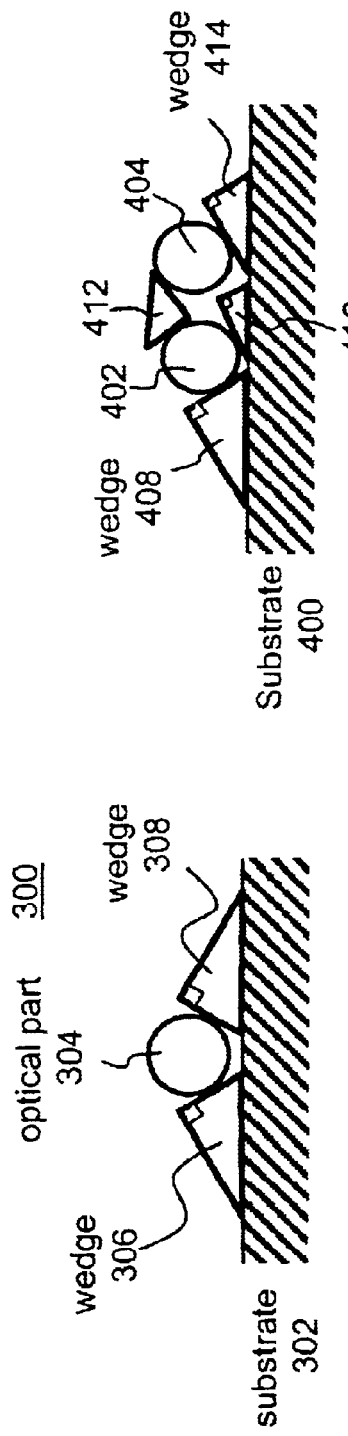
FIG. 4 shows an exemplary setting in which two parallel optical parts are being bonded to a substrate with 4 wedges.

Referring now to FIG. 4, there is shown a setting 400 in which two parallel optical parts 402 and 404 are being bonded to a substrate 406 with 4 wedges 408, 410, 412 and 414. The two parallel optical parts 402 and 404 may have been aligned with respect to each other or with other optical parts. In operation, the wedge 408 may be slid in first and followed by the wedge 410, which resulting in secured positions of the optical part 402. To secure the positions of the optical part 404, the wedge 412 is slid in and followed by the wedge 414. As such, both of the optical parts 402 and 404 are now secured without being disturbed. A bonding agent is applied only to the contacts between the optical parts and the wedges.

Figure 5:
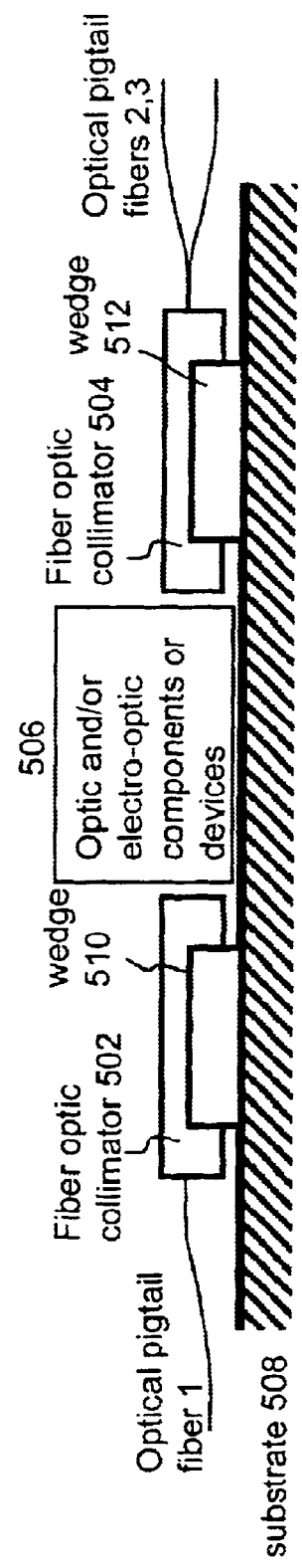
FIG. 5 illustrates a configuration or device in which the present invention may be practiced.

FIG. 5 illustrates a configuration or device 500 in which the present invention may be practiced. The device 500 comprises two collimators 502 and 504 and a device 506, wherein the device 506 is collectively to represent one or more optical parts/devices and functions between the collimators 502 and 504. In a preferable form, the collimators 502 and 504, after being aligned, are to be bonded together with a substrate 508. As illustrated, the gaps between the collimators and the substrate are filled with the wedges (shown as 510 and 512) contemplated in the present invention, resulting in very stable positions for the aligned the collimators 502 and 504.

According to one embodiment of the present invention, the material that is used to make the wedges is preferably from a solid material, for example, glass or metal. However, those skilled in the art will understand that the material selection is not a limitation to the present invention. In fact any material that demonstrates similar characteristics to that of the outside material of optical parts to be bonded may be used. Alternatively, if the resultant devices or parts are to be used in high temperature environment, it is preferably to use a heat-resistant material to avoid any possible material expansion so as to affect the positions of the aligned optical parts.

The present invention has been described in sufficient detail with a certain degree of particularity. It is understood to those skilled in the art that the disclosure of embodiments has been made by way of examples only and that numerous changes in the arrangement and combination of parts may be resorted without departing from the spirit and scope of the invention as claimed. For example, the two wedges may not be separate pieces, one or both of the two wedges may be integrated with another parts in a resultant optical device. Accordingly, the scope of the present invention is defined by the appended claims rather than the forgoing description of embodiments.

We claim:

1. A method for bonding a first and a second optical parts, the method comprising:

positioning the first optical part from a substrate by a small gap, the substrate being generally made and providing no complementary mating profiles for either one of the first and the second optical parts;

after the first optical part is aligned with the second optical part, sliding two wedges respectively towards the first optical part from two directions till respective contacts with the first optical part are established;

applying a small amount of bonding agent to the respective contacts to secure positions of the first optical part with respect to the substrate.

2. The method of claim 1 further comprising fastening the wedges to the substrate so as to form a whole optical device or part of an optical device.

3. The method of claim 2, wherein each of the wedges has a cross-section shaped substantially like a right triangle having a hypotenuse thereof.

4. The method of claim 3, wherein the sliding of the two wedges respectively towards the first optical part from the two directions comprises facing down a sliding side of each of the wedges, wherein the sliding side includes the hypotenuse; and pushing each of the wedges slowly towards the first optical part.

5. The method of claim 3, wherein each of the wedges is so shaped that the sliding of the two wedges respectively towards the first optical part from the two directions will not flip over or up the first optical part that has been already aligned with the second optical part.

6. The method of claim 5, wherein the first optical part is an optical collimator.

7. The method of claim 1, wherein the two directions are so decided that the two wedges, after slid in, can hold up positions of the first optical part.

8. A method for bonding a first and a second optical parts, the method comprising:

positioning the first and the second optical parts from a substrate by a small gap, the substrate being generally made and providing no complementary mating profiles for either one of the first and the second optical parts;

after the first and the second optical parts are aligned with each other, sliding two wedges respectively towards each of the first and the second optical parts from two directions till respective contacts with the each of the first and the second optical parts are established; and applying a small amount of bonding agent to the respective contacts to fasten respective positions of the first and the second optical parts.

9. The method of claim 8 further comprising fastening the two wedges for each of the first and the second optical parts to the substrate.

10. The method of claim 9, wherein each of the wedges has a cross-section shaped substantially like a right triangle having a hypotenuse thereof so that each of the wedges has a sliding side on the hypotenuse.

11. The method of claim 9, wherein the sliding of the two wedges respectively towards each of the first and the second optical parts from two directions comprises facing down the sliding side of each of the wedges; and pushing each of the wedges slowly towards the each of the first and the second optical parts.

12. The method of claim 8, wherein each of the wedges is so shaped that the sliding of the two wedges respectively towards each of the first and the second optical parts will not flip over or up the each of the first and the second optical parts that has been already aligned, when being pushed to slide in.

13. The method of claim 12, wherein each of the wedges has a cross-section shaped substantially like a right triangle.

14. The method of claim 8, wherein the two directions are so decided that the two wedges, after slid in, can hold up positions of the each of the first and the second optical parts.

15. An optical apparatus comprising:

a first and a second optical parts, both aligned with each other to ensure that optical signals can pass through as desired;

two wedges respectively slid in from two different directions and stationed to hold up positions of the first optical part when a bonding agent is applied to contacts between the first optical part and the two respective wedges; and a substrate supporting the two wedges by bonding the two wedges thereto, the substrate being generally made and providing no complementary mating profiles for either one of the first and the second optical parts.

16. The optical apparatus of claim 15, wherein each of the wedges has a cross-section shaped substantially like a right triangle having a hypotenuse thereof so that each of the wedges has a sliding side on the hypotenuse.

17. The optical apparatus of claim 16, wherein each of the two wedges has the sliding side facing the substrate.

18. The optical apparatus of claim 15, wherein the two directions are so decided that the two wedges, after slid in, can hold up positions of the first optical part.

19. The optical apparatus of claim 15, wherein the wedges are not identical and one of the wedges is integrated with another part in the optical apparatus.

20. The optical apparatus of claim 15, wherein the first optical part is a collimator.

* * * * *